Oct. 1, 1929.  M. DAIGNAS  1,729,712
COATING MACHINE
Filed June 17, 1927   2 Sheets-Sheet 1
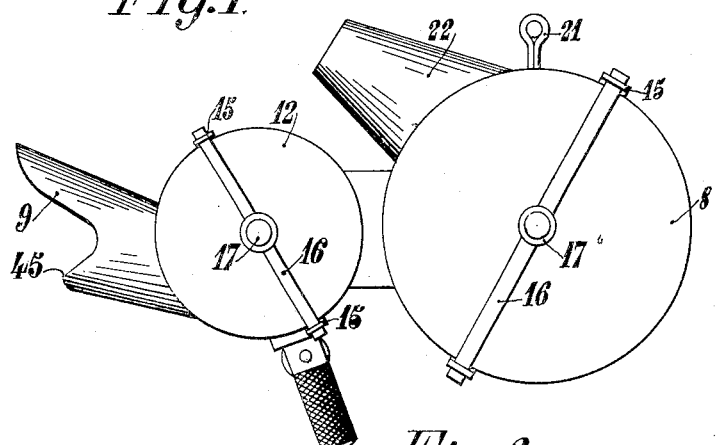
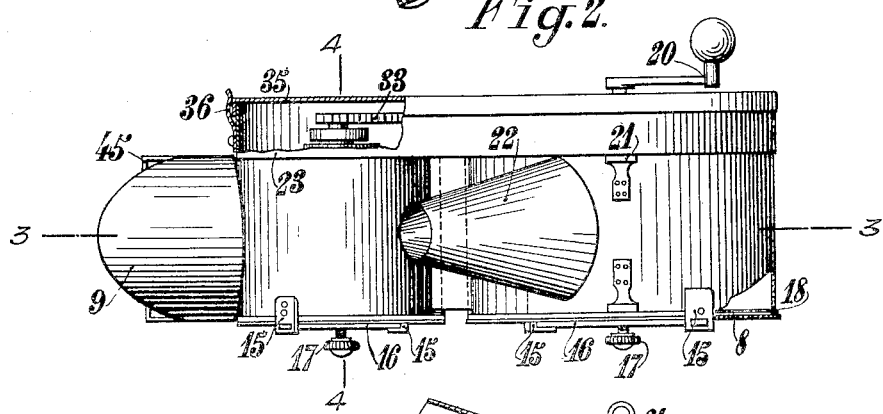
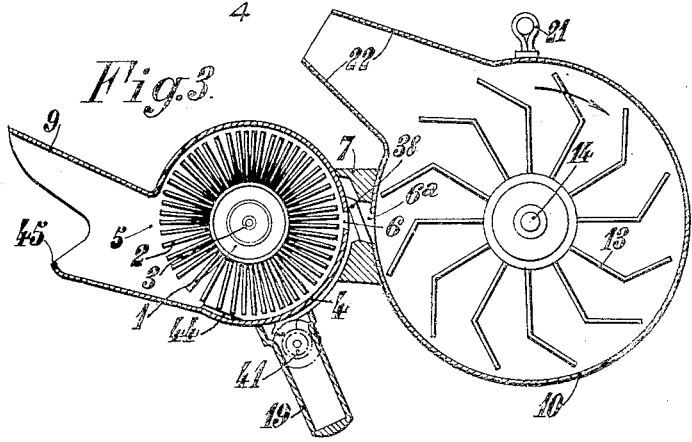

Oct. 1, 1929.  M. DAIGNAS  1,729,712
COATING MACHINE
Filed June 17, 1927  2 Sheets-Sheet 2
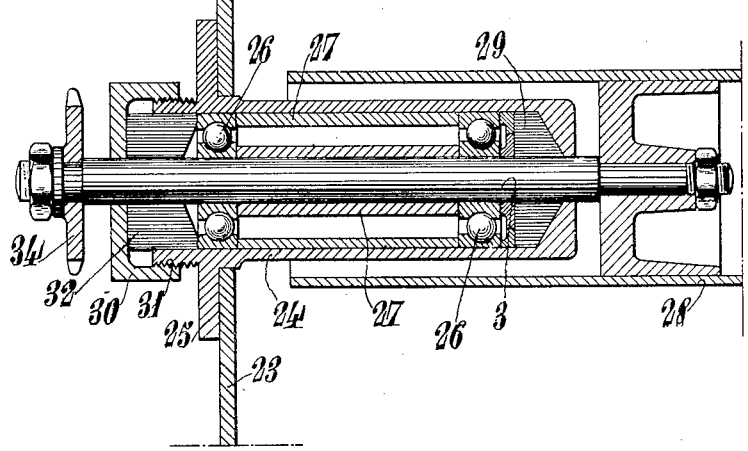
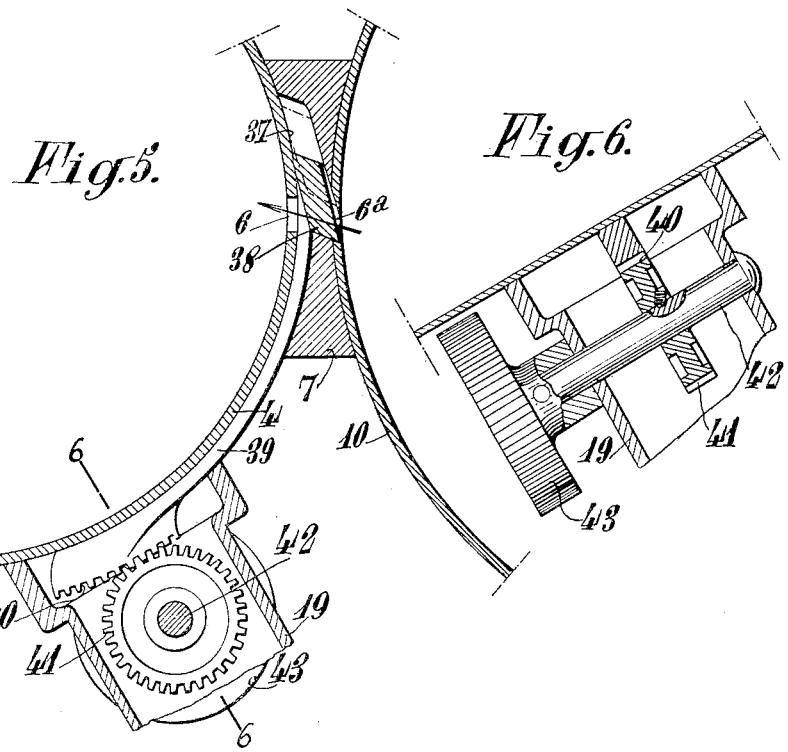
M. Daignas
INVENTOR
By Marks & Clerk
Atty.

Patented Oct. 1, 1929

1,729,712

UNITED STATES PATENT OFFICE

MICHEL DAIGNAS, OF TOUL, FRANCE

COATING MACHINE

Application filed June 17, 1927, Serial No. 199,612, and in France January 6, 1927.

The present invention relates to a coating machine and has for a main object to mechanically obtain the coating of walls by a jet of mortar or other similar substances. This machine is characterized by the combination of a rotor constituting a distributing wheel comprising a shaft provided with radial blades and a casing, forming a stator fed by a distributor of mortar or similar material.

The invention has also for object a portable coating machine capable of being actuated by a single operator.

The said invention has for further object, in a machine of the above mentioned type, means permitting to control the quantity of mortar sprayed.

Other objects of the invention will appear in the following description which refers to the preferred form of construction of the machine.

The accompanying drawing illustrates, by way of example only, one embodiment of the invention.

Fig. 1 is an external view of the complete machine.

Fig. 2 is a corresponding plan view, with parts broken away, to show details of the inner parts of the machine.

Fig. 3 is a vertical section taken along the line 3—3 of Fig. 2.

Fig. 4 is a partial section, on an enlarged scale, taken along the line 4—4 of Fig. 2.

Fig. 5 is a detail of Fig. 3 on an enlarged scale.

Fig. 6 is a section taken along the line 6—6 of Fig. 5.

The machine comprises a rotor 1, which constitutes a distributing wheel and comprises a plurality of radially disposed rods 2 secured on a shaft 3 by any suitable means. These radial rods 2 are, preferably, resiliently distortable and their length is slightly smaller than that of the inner radius of a cylindrical casing 4, forming a stator. This stator 4 is provided with apertures 5 and 6 formed in its cylindrical wall. The aperture 5 opens in a conduit 9 serving to direct the jet of mortar or other coating material.

The casing 10 of the distributor constitutes the stator of a rotor and comprises a shaft 14 on which are regularly distributed and rigidly secured blades or paddles 13 the shape of which corresponds to that recognized up to now as the most advantageous, as illustrated in Fig. 3.

These blades 13 present two planes differently set. One of these planes passes through the longitudinal axis of shaft 14 of the rotor and the other is inclined rearwardly in the direction of rotation indicated by the arm in Fig. 3.

The principle of operation is as follows:

A certain quantity of mortar or material to be projected is poured within the distributor and rotary movements in the same direction are imparted to the two rotors 2 and 13 by means of a mechanism described hereinafter. The mortar is first mixed, then projected by the blades on paddles 13 through the orifices 6ª and 6. It enters the casing 4 and the distributing wheel 2 disperses it through the conduit 9. The control of the quantity of mortar sprayed is obtained by modifying the cross section of the orifices 6 and 6ª, by means of an adjustable shutter.

In its preferred form of construction, the apparatus is so devised that it can be easily carried and operated by a single operator. It is also so constructed that it can be readily taken to pieces and cleaned.

For that purpose, the two casings 4 and 10 are made of sheet-iron and suitably connected by an intermediate member 7, made of a light metal, such as aluminium, in which is arranged the adjusting shutter for the orifices 6ª and 6. Each casing or drum 4 and 10 is provided with a removable bottom 8 and 12 which is secured in the following manner:

Two plates 15 secured by rivets or otherwise on the side wall of each drum, are perforated for the passage of a metal bar 16 provided at its middle portion with a screw threaded hole receiving a locking screw 17 having a milled head. The covers 8 and 12 being applied against the edges of the casings 4 and 10, through the medium of a plastic packing ring 18 (Fig. 2), such as rubber, and the screws 17 are turned in the screw threaded holes of bars 16. The ends of the screws 17 press upon the covers 8 and 12 and hold them in a fluid-tight manner against the walls of the casing. The removal of the covers 8 and 12 is rapidly and easily effected by removing the screws 17, and causing the bars 16 to slide in the plates 15.

The casing 4 is provided with a handle 19 which allows the operator to direct the projected mortar jet, when he rotates a crank 20 with the other hand, whilst the apparatus is suspended from the neck or shoulders by belts attached to loops 21 rigidly secured to the side wall of the casing 10.

The casing 10 is fed with mortar through a conduit 22 having a divergent wall. The shape of this conduit allows of dispensing with an obturator, the mortar not being thrown outside, but carried along by the blades or paddles 13 and driven by the ends of the latter through the orifices 6 and 6ª.

The two rotors 1 and 13—14 are disposed as shown in Fig. 4. The bottom 23 of the casing 4 carries sleeve 24 riveted by its part 25 or rigidly secured in another manner. The ball bearings 26 spaced by tubes 27 support the shaft 3, the end of which, carrying the hub 28 of rotor 1, passes through a fluid-tight packing 29 arranged in the closed end of the sleeve 24. This packing 29 protects the ball bearings 26 against the mortar which is stirred within the casing 4. The immobilization of the ball bearings 26 in the longitudinal direction is effected by clamping them against the ends of their spacing members 27, by means of a cap-nut 30 disposed on a screw-threaded portion 31 of the sleeve 24 and bearing against the outer-ball bearing 26, by means of a plug 32 made of a material such as compressed felt or any equivalent material.

Shaft 14 is provided with an identical arrangement of ball bearings as just described in connection with casing 4 and rotor 1 which has not been deemed necessary to illustrate inasmuch as one description is sufficient to properly understand the construction of the bearings of either shaft.

The shaft 14 carries, at its outer end, a sprocket wheel and an operating crank 20. This sprocket wheel is connected by a chain 33 to a pinion 34 rigidly secured on the shaft 3 of the rotor 1. Both rotors thus always rotate in the same direction, but the rotor 1 rotates sensibly quicker than rotor 13—14.

The chain 33 and the pinions it connects are enclosed in a casing constituted by a cover 35 common to the casings 4 and 10 and secured thereon by any suitable means, such as resilient members 36 (Fig. 2).

The control of the quantity of mortar sprayed projected to the exterior of the conduit, that is to say the control of the proportions of solid materials and water and of the weight of these materials by unit of surface, is obtained as indicated above, by adjusting the cross section of the orifices 6 and 6ª.

These orifices 6 and 6ª are in the shape of oblong ports provided in the side walls of the sheet-iron casings 4 and 10 (Fig. 5). These ports communicate through the medium of a cavity 37 provided in the intermediate member 7 and in which is guided a shutter 38. This shutter 38 is provided with an arcuate rod 39 slidably mounted on the outer surface of the casing 4. The free end of the rod 39 penetrates the handle 19 which is hollow. On this free end is formed a toothed segment 40 meshing with a pinion 41 rigidly secured on a shaft 42 passing through the handle 19 provided with an operating handle 43 exterior of the hollow handle 19.

By acting on the handle 43 (Figs. 5 and 6) the position of the shutter 38 is adjusted in the cavity 37 and, consequently, the amount of opening in the ports 6ª and 6 is regulated. It is obvious that this mechanism controlling the ports 6ª and 6 can be replaced by any means capable of giving the same result, without the principle of operation of the machine being modified.

As indicated above, the rods or blades 2 of the distributing wheel have such a length that they do not touch the inner wall of the casing 4. However, it has been deemed advantageous to arrange at the place of connection of the casing 4 and of the lower part of the conduit 9 (Fig. 3) a seat 44 on which rub the ends of the rods or blades 2. This arrangement ensures the scraping of the totality of the mortar and, moreover, distorts the blades 2 which, by their resiliency, relax when they are no longer in contact with the seat 44. This sudden relaxation increases the speed of projection of the jet of mortar.

Likewise, it has been considered useful to provide on the lower part of the conduit, a rectilinear ledge 45 which distinctly delimits the zones or surfaces covered by the mortar jet and allows the operator to easily conduct his work for obtaining a coating or plastering of regular and uniform thickness.

What I claim as my invention and desire to secure by Letters Patent is:

1. In a portable coating machine of the type described having a feed wheel and casing, a distributing wheel and casing and interconnected orifices in said casings, the combination of a hollow handle on said distributing casing, a shutter disposed between said orifices and means in said handle for controlling said shutter.

2. In a portable coating machine of the type described having a feed wheel and casing, a distributing wheel and casing and interconnected orifices in said casings, the combination of a hollow handle on said distributing casing, an arcuate rod oscillatively mounted on said second casing, a shutter carried by said rod and disposed between said orifices and means in said handle for controlling said rod.

3. In a portable coating machine of the type described having a feed wheel and casing, a distributing wheel and casing and interconnected orifices in said casings, the combination of a hollow handle on said distributing casing, an arcuate rod oscillatively mounted on said second casing, a rack carried by said rod and projecting into said handle, a shutter carried by said rod and disposed between said orifices, a stud shaft carried by said handle, a pinion on said stud shaft meshing with said rack and a knob carried by said stud shaft exterior of the said handle.

4. In a portable coating machine of the type described having a feed wheel and casing, a distributing wheel and casing and interconnected orifices in said casings, the combination of a hollow handle on said distributing casing, a shutter disposed between said orifices, means in said handle for controlling said shutter and a converging feed pipe opening into said feed casing.

5. In a portable coating machine of the type described having a distributing wheel and casing and a feed casing, said casings having interconnected orifices, the combination of a drum rotatably mounted in said feed casing, a plurality of closely spaced paddles mounted radially on said drum, said paddles having a portion disposed in line with the axis of said drum and a bent over portion extending substantially in a direction parallel to the tangent of said drum, a hollow handle on said distributing casing, a shutter disposed between said orifices and means in said handle for controlling said shutter.

6. In a portable coating machine of the type described having a feed wheel and casing, a distributing wheel and casing and interconnected orifices in said casings, the combination of a hollow handle on said distributing casing, a shutter disposed between said orifices, means in said handle for controlling said shutter, a discharge conduit opening into said distributing casing and an up-turned curved flange disposed along the lower edge of said discharge conduit.

7. In a portable coating machine, a distributing wheel, a distributing casing for said wheel, a feed wheel, a feed casing for said feed wheel, oppositely disposed orifices in said casings, a connecting piece for said casings adapted to interconnect said orifices, a controlling shutter in said connecting piece and manually controlled means for operating said wheels in the same direction of rotation.

In testimony whereof I have signed my name to this specification.

MICHEL DAIGNAS.